United States Patent [19]

Eichweber

[11] 4,143,263
[45] Mar. 6, 1979

[54] RECEIVER-TRANSMITTER DEVICE FOR TRANSMITTING DATA BY MEANS OF FOCUSED MODULATED, LIGHT BEAMS

[76] Inventor: Kurt Eichweber, Bodenwald 28, Hamburg-Niendorf, Fed. Rep. of Germany

[21] Appl. No.: 629,386

[22] Filed: Nov. 6, 1975

[30] Foreign Application Priority Data

Nov. 8, 1974 [DE] Fed. Rep. of Germany ....... 2453077

[51] Int. Cl.² .............................................. H04B 9/00
[52] U.S. Cl. ................................... 250/199; 332/7.51; 343/18 D
[58] Field of Search ........... 250/199; 343/18 D, 18 B, 343/18 C; 350/102; 332/7.51

[56] References Cited

U.S. PATENT DOCUMENTS

| | | | |
|---|---|---|---|
| 3,039,093 | 6/1962 | Rockwood | 343/18 C |
| 3,433,960 | 3/1969 | Minott | 250/199 |
| 3,493,294 | 2/1970 | Fitzmauricz et al. | 250/199 |
| 3,584,220 | 6/1971 | Nomura | 250/199 |
| 3,633,158 | 1/1972 | Heibel | 250/199 |
| 3,863,064 | 1/1975 | Doyle et al. | 250/199 |
| 3,989,942 | 11/1976 | Waddoups | 250/199 |

Primary Examiner—Robert L. Griffin
Assistant Examiner—Jin F. Ng
Attorney, Agent, or Firm—Prutzman, Kalb, Chilton & Alix

[57] ABSTRACT

A receiver-transmitter system having a retro-reflector for reflecting an encoded input laser beam back toward the source thereof, an electro-optical mask for selectively masking the retro-reflector, and a mask control system operable by an input beam sensor for unmasking the retro-reflector if the input beam has a predetermined encoded input and for pulse modulation of the reflected beam with the electro-optical mask for transmitting data back to the input beam source.

12 Claims, 2 Drawing Figures

RECEIVER-TRANSMITTER DEVICE FOR TRANSMITTING DATA BY MEANS OF FOCUSED MODULATED, LIGHT BEAMS

BACKGROUND OF THE INVENTION

1. Field of the Invention

The present invention relates to a receiver-transmitter device for transmitting data by means of focused, modulated light beams, more particularly, by means of pulse-coded laser beams, comprising a photoelectric sensor intended for the incoming light beam and coupled to an optical receiver device, an optical device for transmitting an answer light beam in the direction of the input light beam and a modulator for modulating the answer light beam. As used herein, the term light beam includes visible and invisible beams such as infrared and other optical radiation beams which may be optically controlled.

2. Description of the Prior Art

The exchange of data between two stations by means of a modulated light beam can occur, for example, in conventional communication systems such as telephoto, modulated light speech, teleprinting systems, etc. A preferred application for the present invention is that of data exchange in military identification systems for detecting and distinguishing targets, known under the abreviation IFF. In systems of this type, such as the systems described in German Auslegeschrift No. 2,142,944 and German Offenlegungsschrift No. 2,215,463, an interrogating station, which is generally connected with a weapon, transmits an interrogation signal to an unidentified target, which, if it is a friendly or allied target, is received at the target, where it triggers the transmission of a suitably coded answer signal to the interrogating station. Dependent on whether this answer is or is not received, further operations are then controlled at the interrogating station, for example, the releasing of the target bombardment.

A problem which occurs not only in the case of this military data exchange system but also in the case of every data exchange system employing focused light beams, more particularly, laser beams, is that the answer light beam must be transmitted exactly in the direction of the received light beam in order for it to reach the interrogating station. The earlier proposals for solving this problem were directed to the task of designing the optical receiver device in such a way that it was possible to determine the direction of the incoming light beam in terms of its elevation and azimuth, thus enabling a transmitter for transmitting the answer light beam to be controlled according to the determined directional values. As this system necessitates the use of complicated direction finding systems and directional coupling devices for guiding the transmitting device even in the case of stationary receiver stations, it will be appreciated that in the case of receiver stations mounted on transport means, for example, on tanks, ships, etc., the problem is even more difficult and can only be solved at great expense using gyroscopically stabilized devices. Furthermore, these systems do not offer a sufficiently high degree of operational reliability when they are used as IFF equipment; this demands immediate reaction of the target, generally in the msec. range. The orientation periods required by the regulating devices would be excessive. An answer signal transmitter which transmits over a wide optical range is not desirable, as the signals could be picked up at other points. Furthermore, it would be nceessary to use considerably more energy which should be avoided in view of the threshold value which the human eye can tolerate.

SUMMARY OF THE INVENTION

The object of the present invention is thus, with simple means, to produce a device capable of transmitting a suitably modulated answer light beam exactly in the direction of the input light beam.

According to the invention, this problem is solved by means of at least one optical reflector reflecting back on itself the input light beam and by means of an optical modulator connected in the path of the output light beam produced by this reflection.

Thus, in contrast to the earlier proposals, the theory of separately producing, aligning and stabilizing an answer light beam has been dropped and the input light beam per se is used as the carrier and also the answer signal which modulates it when it is reflected. The advantage of this is that the requirement that the input and output light beam should be uniformly directed is always completely fulfilled.

Reflectors which reflect back a light beam in themselves, irrespective of the direction of incidence are known, for example, in the form of triple reflectors (retro-reflectors, corner reflectors), and are used, for example, in geodesy, for measuring distances by means of methods employing light. What is novel is the combination according to the invention of a reflector of this type, with both a sensor, to which is connected a device intended to evaluate the data contained in the input light beam, and with a modulator for the reflected output light beam.

In contrast to the former proposals which proceed from modulation of the output light which is produced separately, i.e., corresponding control of the answer transmitter, the present invention employs optical modulators, which could also be referred to as electrooptical switches, for transmitted light. Modulators of this type are also known and available, for example, in the form of liquid crystal or KDP modulators or piezoceramic modulators.

The angle, within which a triple reflector can receive and reflect back a light beam, is limited. To obtain omnidirectional reception it is possible to arrange, preferably a plurality of reflectors, each with their respective sensor and modulator, in a suitable manner, for example, in the form of a ring, a semi-sphere, or the like. In this case, to simplify the arrangement, it is also possible to provide a common central sensor having a semi-spherical reception characteristic for all the reflectors disposed in a ring-form or spherical arrangement. If necessary, some or all the reflectors can also be associated with a common modulator.

In a preferred embodiment of the invention, the modulator is normally in the light-impermeable, blocking state and it is only controlled into the light-permeable state when the appropriate input light beam is received by the sensor. This prevents the reflector from being used for unauthorized bearing or distance measurements.

Other objects, features and advantages of the present invention will be made apparent in the following detailed description of a preferred embodiment thereof provided with reference to the accompanying drawings.

DESCRIPTION OF THE PREFERRED EMBODIMENT

Figure 1:
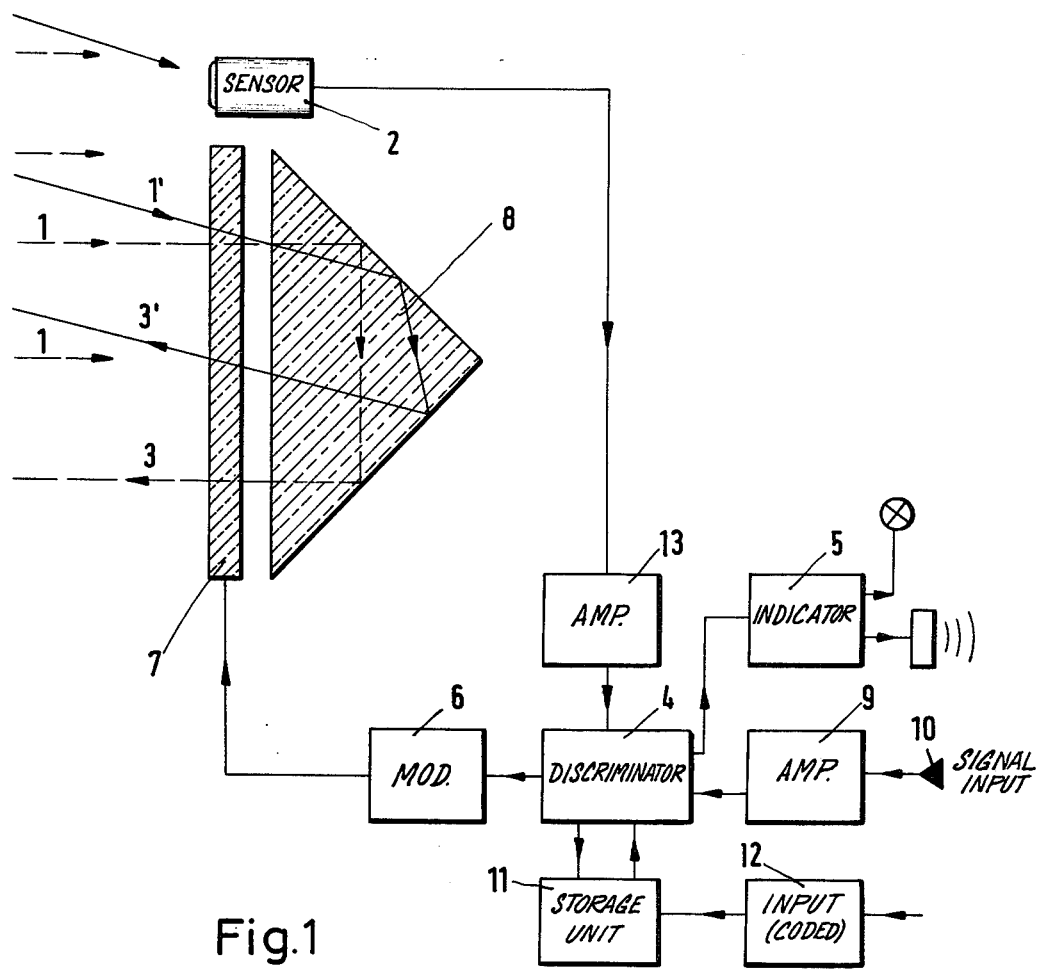
FIG. 1 is a schematic diagram of the device according to the invention.

The device represented in diagrammatic form in FIG. 1 is used to receive a sharply focused light beam 1. This is produced and transmitted by an interrogating station (not represented) which is provided with suitable view finding devices (also not shown) for sighting the answering station. The transmitting device for producing the light beam 1 is either directly coupled with this view finding device in an axially parallel manner or it is coupled via remote-control follow-up devices and, if necessary, is spatially stabilized, for example, by means of a gyroscopic device. When the device according to the invention is being used for military purposes, the view finder is most likely the view finder of a weapon. The transmitting device for producing the light beam 1 is preferably a laser, more particularly, a semiconductor laser, possibly having optical devices for focusing the light beam connected in series therewith. A light beam 1 having a power density below the tolerance limit for the human eye is preferably used; this can be obtained very easily by means of semiconductor lasers.

The interrogating light beam 1 comprises a modulation for indentification and/or data transmission purposes. This preferably consists of a pulse modulation having fixed or variable frequencies and/or a fixed frequency with incorporated identification codes for the receiver. At the receiver station, where the device shown in FIG. 1 is located, the light beam 1 falls onto a reflector 8, more particularly a triple reflector. The latter reflects the light beam 1 on itself, irrespective of the direction of incidence of the light beam, i.e., even in the case of the oblique angle of incidence 1', thereby producing an output or answer light beam 3 or 3'. This answer light beam, which is produced by reflection, is used according to the invention as the carrier of the answer modulation. It can also be used at the transmitting station for resighting the receiver station.

A portion of the input light beam 1 falls on a photoelectric sensor 2, which can consist of a normal photodiode or, if elevated sensitivities and switching rates are required, of, for example, an avalanche-photodiode. The output signal of the sensor 2 is transmitted through an amplifier 13 to a discriminator 4 where the information contained in the light beam 1, which has been received, can be evaluated. For example, the identification value which has been received can be compared with a stored identification value and the correspondence and/or lack of correspondence can be visually and/or acoustically indicated in an indicator stage 5, thereby informing the answer station that an interrogating signal has been received. It is obviously also possible for the indicator station to reproduce spoken information by means of a loudspeaker, teleprinter, or the like.

A modulator or mask 7 is connected in series with the reflector 8. The light transmittancy of the modulator 7 can be varied by selectively applying an electric signal thereto for selectively masking and unmasking the reflector 8. A modulator of this type, which can also be considered as an optical switch, can be in the form of a liquid crystal, KHD or piezo-ceramic modulator. The conventional Kerr cells and Pockel cells are also suitable, in principle, but on account of their high cost, the small aperture and other disadvantages, they are less preferably.

The modulator on mask 7 is controllable by the discriminator stage 4 which draws its control signal, for example, from an amplifier and signal stage 9. The control signal can be fed into the stage 9 either as a speech signal by a microphone 10 or as a standardized identification signal for friend- enemy-recognition, which is stored in storage unit 11 or which is supplied by means of a coding device. The discriminator controls the modulator 7 via the modulation control stage 6 in such a way as to ensure that the modulation of the reflected light beam 3 is only triggered when a correctly coded interrogation signal contained in the input light beam 1 is received via the sensor 2 and the discriminator 4. The information contained in the input signal thus releases modulation or digital coding of the answer light beam 3 by means of the information contained in the storage unit 11 and/or produces the change-over to commencement of light signal traffic by means of the signal input device, for example, a microphone.

The modulator 7 is preferably so controlled that it is normally in a constantly opaque blocking state, thereby preventing foreign light signals from reaching the reflector, i.e., to prevent this from being used by a supposed enemy for taking a bearing on the receiver station. Opening of the modulator is only started after a coded signal picked up by a parallel sensor has been decoded and recognized as a friendly signal.

In deviation from this mode of operation, it is obviously also possible to initially keep the optical modulator 7 constantly open for reception of a light beam 1, thus enabling the light beam to strike the reflector 8 and be returned to the transmitting or interrogating station. This may be desirable for the purpose of orienting the laser emitter.

Figure 2:
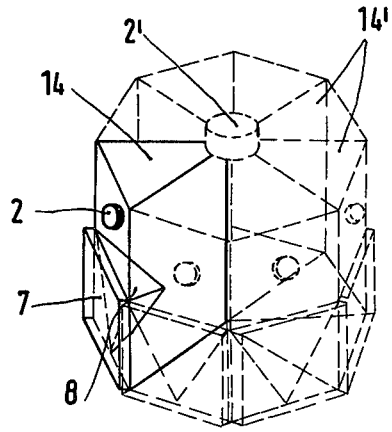
FIG. 2 is a diagrammatic view of a preferred arrangement of the reflectors.

The reflector, modulator and/or sensor can be combined in one unit, for example, they can be glued or cemented together in a light-permeable manner. FIG. 2 represents, by way of example, a triangular block 14, inside which is formed the triple reflector 8, and to the front face of which are glued the sensor 2 and the modulator 7. The respective electrical connections have not been represented so as to simplify the drawing.

To obtain omnidirectional reception, a plurality of reflectors in the form of the triple reflectors 8, can be used, for example, in a circular or crown-shaped arrangement. This is represented by way of example in FIG. 2 by the addition of further triangular glass blocks 14'. Each of these triple reflectors can be provided with its own modulator 7 and its own photoelectric sensor 2. However, another embodiment is also possible wherein the light strikes a common, central sensor 2' having an omnidirectional reception characteristic. The circular arrangement can be filled in at its upper and lower part to form a generally spherical device. A plurality of devices, each covering a sector, can be connected in parallel to increase the efficiency of the device.

Other features which improve the operation of the device can also be provided. More particularly, it can be designed in such a way that only light beams of the specific wave length which is used by the particular transmitting station can reach the reflector and/or be reflected by the same. This can be achieved by selective dereflection of the continuous surfaces and/or selective mirror-coating of the reflection surfaces of the modulator and/or reflector.

What is claimed is:

1. A light beam receiver-transmitter system comprising an optical retro-reflector for reflecting an encoded input light beam back toward the source thereof as an answer light beam, electro-optical masking means operable for selectively masking and unmasking the retro-reflector for selectively blocking and unblocking at least one of said beams and thereby selectively prevent the transmission of an answer light beam to the source of the input beam, and control means for operating the electro-optical masking means for normally masking the retro-reflector, the control means comprising a sensor for sensing a code of an encoded input light beam, discriminating means for determining if a sensed code of an input light beam is a predetermined code, and mask control means operable by the discriminating means for operating the electro-optical masking means for unmasking the retro-reflector for transmitting an answer light beam back to said source when an encoded input light beam has said predetermined code.

2. A light beam receiver-transmitter system according to claim 1 wherein the mask control means is operable for selectively operating the electro-optical masking means for modulating the answer light beam for transmitting data therewith to said source.

3. A light beam receiver-transmitter system according to claim 2 wherein the mask control means is operable for selectively operating the electro-optical masking means for pulse coded modulation of the answer light beam.

4. A light beam receiver-transmitter system according to claim 1 wherein the electro-optical masking means has alternative light impermeable and light permeable states for respectively masking and unmasking the optical retro-reflector.

5. A light beam receiver-transmitter system according to claim 1 wherein the system comprises wave length control means for controlling the wave length of the answer light beam.

6. A light beam receiver-transmitter system according to claim 1 wherein said electro-optical masking means is a liquid crystal electro-optical masking means.

7. A light beam receiver-transmitter system according to claim 1 wherein said electro-optical masking means is a KDP electro-optical masking means.

8. A light beam receiver-transmitter system according to claim 1 wherein said electro-optical masking means is a piezo-ceramic electro-optical masking means.

9. A light beam receiver-transmitter system according to claim 1 further comprising storage means for storing said predetermined code, wherein the discriminating means is operable for comparing a sensed code of an encoded input light beam with said predetermined code, and further comprising indicator means for indicating said comparison.

10. An optical radiation beam receiver-transmitter system comprising optical retro-reflector means for receiving and reflecting an input optical radiation beam back toward the source thereof as an answer beam, electro-optical masking means selectively operable for selectively masking the retro-reflector means for selectively transmitting an answer beam to the source of the input beam, the optical retro-reflector means comprising an annular arrangement of a plurality of retro-reflectors, each operable within a predetermined angular range for receiving and reflecting an input beam back toward the source thereof, and collectively having substantially a 360° operating range, the masking means being operable for individually selectively masking and unmasking each of the retro-reflectors for controlling the transmission of an answer beam therefrom back to the source thereof, and code sensing means for the annular arrangement of retro-reflectors for sensing a predetermined encoded input beam to the annular arrangement of retro-reflectors, and discriminating means, for selectively operating the masking means (when the code sensing means senses a predetermined encoded input beam to any retro-reflector,) for unmasking at least each of those retro-reflectors for reflecting said predetermined encoded input beam as an answer beam.

11. An optical radiation beam receiver-transmitter system according to claim 10 wherein the code sensing means comprises a code sensor for simultaneously sensing a said predetermined encoded light beam to the plurality of retro-reflectors.

12. In a secure passive laser data link system having a first pulsed laser transmitter-receiver unit for transmitting a coded modulated laser interrogation beam and for receiving a modulated laser beam, and also having a remote passive transponder, the improvement wherein the transponder comprises:

first means for interrogation code recognition, said first means including means responsive to said coded modulation on said received laser beam to provide a control output when said coded modulation is determined to be in accordance with a predetermined code;

second means comprising an optical means, said optical means including reflective means within its light path for retro-reflecting said interrogation beam;

and third means responsive to said first means and inserted in said light path for substantially altering the light transmissibality, thereby to substantially reduce said retro-reflection of said interrogation beams in the absence of said first means control output and to permit said retro-reflection when said control output is extant.

* * * * *